United States Patent
Zissimopoulos et al.

(10) Patent No.: US 7,200,577 B2
(45) Date of Patent: Apr. 3, 2007

(54) METHOD AND APPARATUS FOR SECURE ONLINE TRANSACTIONS

(75) Inventors: Vasileios "Bill" Zissimopoulos, San Francisco, CA (US); Jai Rawat, Sunnyvale, CA (US); John Marshall, Napa, CA (US)

(73) Assignee: America Online Incorporated, Dulles, VA (US)

( * ) Notice: Subject to any disclaimer, the term of this patent is extended or adjusted under 35 U.S.C. 154(b) by 791 days.

(21) Appl. No.: 10/137,479

(22) Filed: May 1, 2002

(65) Prior Publication Data
US 2003/0208682 A1 Nov. 6, 2003

(51) Int. Cl.
*G06Q 99/00* (2006.01)
(52) U.S. Cl. .............. 705/67; 705/64; 705/65; 705/72; 705/78; 705/41; 713/182; 713/183; 713/184; 713/185; 726/35; 726/5; 726/7; 726/9
(58) Field of Classification Search .......... 705/64–67, 705/70, 74–79, 40–42, 44, 72; 726/35, 5, 726/7–10; 713/182–186
See application file for complete search history.

(56) References Cited

U.S. PATENT DOCUMENTS

| | | | | |
|---|---|---|---|---|
| 5,642,419 | A | 6/1997 | Rosen | 380/23 |
| 5,815,657 | A | 9/1998 | Williams et al. | 395/186 |
| 5,826,241 | A | 10/1998 | Stein et al. | 705/26 |
| 5,848,161 | A | 12/1998 | Luneau et al. | 380/49 |
| 5,878,141 | A | 3/1999 | Daly et al. | 380/25 |
| 5,920,847 | A | 7/1999 | Kolling et al. | 705/40 |
| 5,960,411 | A * | 9/1999 | Hartman et al. | 705/26 |
| 5,983,208 | A | 11/1999 | Haller et al. | 705/40 |
| 5,987,132 | A | 11/1999 | Rowney | 380/24 |
| 5,987,140 | A | 11/1999 | Rowney et al. | 380/49 |

(Continued)

FOREIGN PATENT DOCUMENTS

EP  1 077 419  2/2001

(Continued)

OTHER PUBLICATIONS

*Secure Electronic Data Interchange*; J.L. Snare; Computer Security in the Age of Information. Proceedings of the Fifth IFIP International Conference; May 19-21, 1998.

(Continued)

*Primary Examiner*—Jalatee Worjloh
(74) *Attorney, Agent, or Firm*—Michael A. Glenn; Glenn Patent Group

(57) ABSTRACT

A method and apparatus for performing secure online transactions provides a user interface that is intuitive and easily to understand. The invention integrates an online wallet service with credit card issuers that provide online credit card authentication services. The method provides a keypad interface for PIN entry, or an interface that resembles an offline transaction receipt. The apparatus that stores personal information and credit card information uses a level-two authentication password to protect the user's credit card information. The invention integrates with the credit card issuer when a personal identification number is required for the user to perform online transactions by the credit card issuer. The embodiments include integrations when the level-two authentication password is equivalent to the personal identification number and that when they or not equivalent.

12 Claims, 5 Drawing Sheets

U.S. PATENT DOCUMENTS

| | | | | |
|---|---|---|---|---|
| 6,016,484 | A | 1/2000 | Williams et al. | 705/39 |
| 6,018,724 | A | 1/2000 | Arent | 705/44 |
| 6,029,150 | A | 2/2000 | Kravitz | 705/39 |
| 6,070,150 | A | 5/2000 | Remington et al. | 705/34 |
| 6,085,168 | A | 7/2000 | Mori et al. | 705/17 |
| 6,115,471 | A | 9/2000 | Oki et al. | 380/242 |
| 6,163,772 | A | 12/2000 | Kramer et al. | 705/79 |
| 6,167,378 | A | 12/2000 | Webber, Jr. | 705/8 |
| 6,175,922 | B1 | 1/2001 | Wang | 713/182 |
| 6,178,409 | B1 | 1/2001 | Weber et al. | 705/79 |
| 6,202,051 | B1 | 3/2001 | Woolston | 705/27 |
| 6,233,568 | B1 | 5/2001 | Kara | 705/410 |
| 6,236,972 | B1 | 5/2001 | Shkedy | 705/1 |
| 6,282,522 | B1 | 8/2001 | Davis et al. | 705/41 |
| 6,282,656 | B1 | 8/2001 | Wang | 713/201 |
| 6,324,525 | B1 | 11/2001 | Kramer et al. | 705/40 |
| 2002/0029195 | A1* | 3/2002 | Russell et al. | 705/40 |
| 2002/0038287 | A1* | 3/2002 | Villaret et al. | 705/41 |
| 2002/0077993 | A1* | 6/2002 | Immonen et al. | 705/77 |
| 2002/0120568 | A1* | 8/2002 | Leblang et al. | 705/40 |
| 2002/0164031 | A1* | 11/2002 | Piikivi | 380/270 |
| 2003/0182558 | A1* | 9/2003 | Lazzaro et al. | 713/183 |
| 2004/0103063 | A1* | 5/2004 | Takayama et al. | 705/41 |
| 2004/0172552 | A1* | 9/2004 | Boyles et al. | 713/200 |
| 2004/0260647 | A1* | 12/2004 | Blinn et al. | 705/41 |
| 2005/0187883 | A1* | 8/2005 | Bishop et al. | 705/67 |

FOREIGN PATENT DOCUMENTS

| | | |
|---|---|---|
| EP | 1 077 436 | 2/2001 |
| EP | 1 107 198 | 6/2001 |
| EP | 1 132 839 | 9/2001 |
| EP | 1 132 873 | 9/2001 |
| EP | 1 132 875 | 9/2001 |
| EP | 1 150 262 | 10/2001 |
| WO | WO 00/49586 | * 8/2000 |

OTHER PUBLICATIONS

*Zero—Knowledge Proofs of Identity and Veracity of Transaction Receipts*; G.J. Simmons, and G.B. Purdy; Advances in Cryptology—Eurocrypt '88. Workshop on the Theory and Application; May 25-27, 1988.

*XFDL: Creating Electronic Commerce Transaction Records Using XML*; B. Blair, and J. Boyer; Computer Networks; May 17, 1999.

*Achieving Non-Repudiation of Receipt*; N. Ahang, and Q. Shi; Computer Journal; 1996.

*Electronic Commerce and the Invoicing Cycle*; A. Troye; Tolley's Computer Law and Practice; 1995.

*Evidence and Non-Repudiation*; Jiaying Zhou and Dieter Gollmann.

*Accountability in Electronic Commerce Protocols*; Rajashekar Kailar.

*Benefits of a Universal Security Framework*; Arnd Weber.

*Arcot—Visa 3D Secure Payment System Architecture*; http://www.arcot.com/transfort_tech.html.

*Brodia—Your Foundation for Emerging Commerce*; http://www.brodia.com/prod_products.htm.

*EMV '96 Integrated Circuit Card Terminal Specification for Payment Systems Version 3.0*; Jun. 30, 1996.

*A New Distributed Secure Electronic Auction Protocols*; Ji Dong-Yao; Wang Yu-Min; Chinese Journal of Computers; May 2001.

*Trust -vs- Threats: Recovery and Survival in Electronic Commerce*; Jiawen Su, and D.W. Manchala; 19th IEEE International Conference on Distributed Computing Systems; May 31-Jun. 4, 1999.

*On the Efficient Implementation of Fair Non-Reproduction*; C.H. You, J. Zhou, and K.Y. Lam; Computer Communication Review; Oct. 1998.

*MasterCard Boosts Security*; Rutrell Yasin; http://www.internetweek.com/story/INW20010517S0007.

*Persistent Authenticated Dictionaries and Their Aplications*; Aris Anagnostopoulos, Michael T. Goodrich, and Robert Tamassia.

*Getting the Most Out of Gator and OfferCompanion*; http://www.gator.com/about/.

*Security Services for Multimedia Conferencing*; Suart G. Stubblebine; Proceeding of the 16th National Computer Security Conference; Sep. 20-23, 1993.

*Server-Supported Signatures*; N. Asokan, G. Tsudik, and M. Waidner; Journal of Computer Security; Fall 1997.

*State of the Art in Electronic Payment Ssystems*; N. Asokan, P. Janson, M. Steiner, and M. Waidner; Oct. 4, 1999.

*VeriSign: Payment Processing*; http://www.verisign.com/products/payment.html.

*Visa Mobile 3D Secure Specification for M-Commerce Security*; http:/www.cellular.co.za/technologies/mobile-3d/visa_mobile_3d.htm.

* cited by examiner

450

METHOD AND APPARATUS FOR SECURE ONLINE TRANSACTIONS

BACKGROUND OF THE INVENTION

1. Technical Field

The invention relates generally to electronic transaction technology. More particularly, this invention relates to a system and method for secure online transactions.

2. Description of the Prior Art

The explosive growth of the Internet is changing the ways in which we communicate, conduct business, and pursue entertainment. A few years ago, electronic commerce (E-commerce) was just an interesting concept. By 1999, however, it had become the hottest thing around. Today, not only are consumers buying an enormous volume of goods or services over the Internet, but the business-to-business E-commerce has taken off as well.

As online transactions grow, a higher rate of charge-backs also grows due to fraudulent transactions. According to one report, online fraud is ten times higher than in the real world. Merchants bear the cost of fraud 10 to 15 per cent of the time if a credit card is present, while E-commerce retailers bear the cost about 25 per cent of the time.

The security of online transactions has become a major concern for the user and the merchant, as well as for the credit card issuers. If fraudulent transactions are minimized, the confidence involved parties have in online transactions can be greatly increased, and online transactions can make a great jump in e-commerce world.

In responding to that need, several approaches have been developed. For example, MasterCard and VISA have cooperatively developed the Secure Electronic Transactions (SET) Protocol. SET combines ideas from the previous proposals by MasterCard and VISA. The SET Secure Electronic Transaction™ protocol is an open industry standard developed for the secure transmission of payment information over the Internet and other electronic networks. SSL Secure Socket Layer (SSL) (developed by Netscape Communications Company) is a standard that encrypts data between a Web browser and a Web server. SSL does not specify what data are sent or encrypted. In an SSL session, all data sent are encrypted.

SET uses a system of locks and keys along with certified account IDs for both consumers and merchants. Then, through a unique process of encrypting or scrambling the information exchanged between the shopper and the online store, SET ensures a payment process that is convenient, private and, most of all, secure.

SET has numerous advantages. For example, it establishes industry standards to keep the user's order and payment information confidential, increases integrity for all transmitted data through encryption, and provides authentication that a cardholder is a legitimate user of a branded payment card account. However, to deploy SET, digital certificates are required for all participating parties.

VISA has unveiled another system that lets a user attach a password to his credit card number called 3D Secure. This ensures that if a thief gets hold of the user's card number the card cannot be used over the Internet unless the thief has the password that only the user knows. To take advantage of 3D Secure, the user must go to the site of issuer of his VISA card and register a password for the card. This enrollment process takes the user's password and attaches it to his card number. When he visits an online merchant and makes a purchase by entering the VISA credit card number, he is prompted for his password for the card before going through the regular transaction.

MasterCard also developed Secure Payment Application™ (SPA), a solution for securing credit and debit payments between the user, online merchants and members, to address the issue of cardholder authentication. SPA is an issuer-based security scheme that takes advantage of MasterCard's Universal Cardholder Authentication Field (UCAF) infrastructure. UCAF is a universal, multipurpose data transport mechanism implemented by merchants for collecting authentication information generated by issuers and cardholders. Once collected, this information is communicated to the issuer in the payment authorization request and provides explicit evidence that it is the legitimate cardholder who originated the transaction. UCAF supports a variety of issuer security and authentication approaches including SPA, smart cards and more.

SPA adds a significant security component by including a unique cardholder authentication value for each transaction that can be verified by the issuer during payment authorization. Merchants are responsible for collecting and passing this cardholder authentication value, and including it along with other payment information, at the time of authorization.

To ensure proper cardholder authentication, the, prior art approaches require that users go through an added authentication step to complete their purchase. Currently this step adds confusion and is cumbersome for the user to understand. Therefore, user adoption remains the biggest problem for these schemes.

What is desired is a secure solution to make the added authentication step intuitive and easy to understand by the user.

What is further desired is to make the secure solution have a user interface that resembles the offline credit card transactions, so that it may be widely accepted by the online world.

What is further desired is a solution that integrates with the credit card issuer when a personal identification number is required for the user to perform online transactions by the credit card issuer.

SUMMARY OF INVENTION

The presently preferred embodiment of the invention provides an approach for performing secure online transactions which has a user interface that is intuitive and easy to understand. It integrates an online wallet service with credit card issuers that provide online credit card authentication services.

One preferred embodiment comprises a method for performing secure online transactions. The user first registers to the merchant by providing his personal information and credit card information. The user then logs on to start the transaction. When the user checks out, the use is prompted with a keypad interface for PIN entry or an interface that resembles an offline transaction receipt.

Another equally preferred embodiment comprises an apparatus that stores personal information and credit card information. The apparatus comprises a level-two authentication password that protects the user's credit card information. The apparatus comprises an authentication technique that is integrated by the credit card issuer when a personal identification number is required for the user to perform online transactions, where the level-two authentication password is equivalent to the personal identification number.

Another preferred embodiment comprises an apparatus that performs secure online transactions. This embodiment is integrated by the credit card issuer, but comprises different level-two authentication password and personal identification number.

DETAILED DESCRIPTION

The presently preferred embodiment of the invention comprises a secure online transaction technique that provides secure authentication of a user's credit card information. The invention comprises a technique that makes the additional authentication step intuitive and easy to understand. Users are already familiar and comfortable with the extra step of entering a personal identification number (PIN) or signing a receipt in the offline world, this invention provides a similar user experience, but in the online world. In particular, this task is fulfilled by displaying a keypad interface for PIN entry, or an interface that resembles an offline transaction receipt. Because the interface animates the offline experience, the user may easily recognize the interface and accept the extra authentication step.

Figure 1:
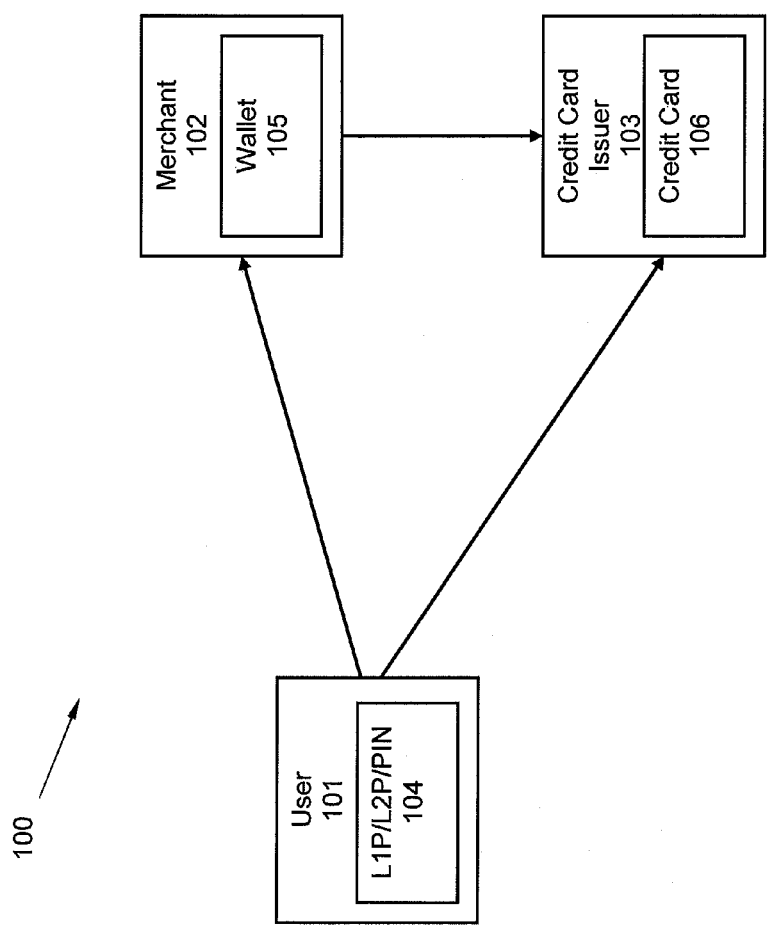
FIG. 1 is a block diagram illustrating an online transaction system.

FIG. 1 depicts a system 100 that performs secure online transactions according to the invention. The system is made available to a user 101 who is shopping for merchandize or services online over a network, such as the Internet. A merchant 102 is accessed by the user. The merchant is typically selling merchandize or services online over the Internet. A credit card issuer 103 provides credit card services for a transaction between the user and the merchant.

To authenticate the user 101, the merchant 102 often requires the user to provide his personal information and credit card information. Both of the personal information and credit card information are stored to an online wallet 105 by the merchant 102 while the user 101 chooses a private authentication password. A level-one authentication password (L1P) 104 is often required when the user 101 needs to accept personal information from the wallet 105 or when he starts shopping at the merchant's online site. To ensure the security of the user's credit card information, a second level authentication 104 is required to access the user's credit card information. Additionally, the credit card issuer 103 may require an additional authentication step for online purchase to prevent fraudulent use of credit card online.

The authentication information often includes a user identifier and an associated password. In the discussion below, L2P refers to the password of the second authentication step of the online wallet service, and PIN refers to the password required by the credit card issuer to authenticate online transactions. If a universal wallet service is used by both the credit card issuer and the merchant, the user may enroll his credit card to the wallet at either the merchant's site or the credit card issuer's site.

In one preferred embodiment of the invention, the user's L2P is equivalent to PIN. A typical card enrollment in the online wallet at the merchant site comprises the steps of:

The user decides to add a card to his online wallet;

The wallet checks whether the credit card issuer provides online enrollment of addition online authentication;

If so, the wallet asks the user to opt into online credit card authentication from the credit card issuer;

If the user opts in, the wallet notifies the credit card issuer. Note that the user does not have to create any extra passwords; and If the user does not opt in, the card is simply stored in the wallet;

A typical card enrollment for online transactions at the credit card issuer's site comprises the steps of:

The user navigates to the issuer site;

The issuer site gives user an option to login using authentication credentials of the online wallet service.

If the user is a user of the online wallet service and already has L2P, card enrollment is performed without the need to create a PIN;

If the user is a user of the online wallet service and does not have L2P, he creates L2P on this site and enrolls the card. There is no need to create a separate PIN because L2P can act as a PIN; and If the user is not a user of the online wallet service, he enrolls in the online wallet service and creates L2P to enroll the card.

The card enrollment process results in automatic creation of an online wallet containing the card. If the user already has an online wallet, the card gets added to the existing wallet. All users ultimately have an L2P and an online wallet after card enrollment at any issuer.

Figure 2:
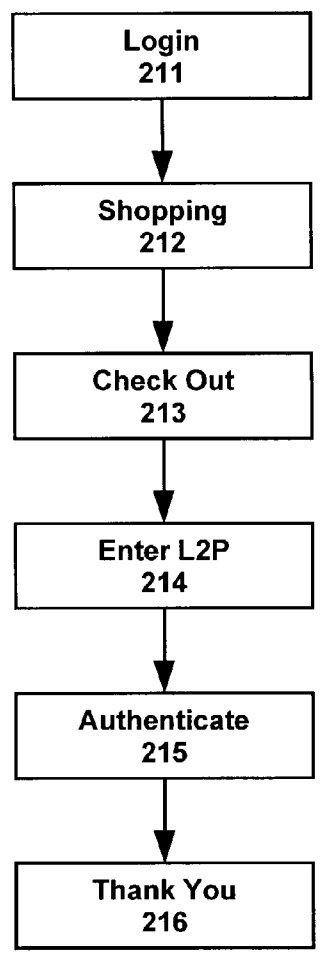
FIG. 2 is a flow diagram illustrating a method for providing secure online transactions according to one embodiment of the invention.

FIG. 2 is a flow diagram illustrating a method 210 for providing secure online transactions according to one embodiment of the invention. A typical implementation of the method comprises the steps of:

Step 211: The user logs in to a merchant site;

Step 212: The user shops at the merchant site;

Step 213: The user starts to check out at the merchant site;

Step 214: The user enters L2P to access his online wallet;

Step 215: The wallet authenticates the user; and

Step 216: The user picks any card from the wallet to complete checkout.

In this embodiment, it does not matter whether the merchant implements the credit card authentication service from the issuer. Nor does it matter which card the user decides to use. It is all completely transparent to the user.

This embodiment provides a presently preferred approach because it leads to a simple user experience and is compatible with the online architecture. However, it may be difficult to get credit card issuers to agree to the approach because issuers are currently responsible for transaction liability.

In another preferred embodiment of the invention, the user's L2P is not equivalent to PIN. A typical card enrollment in the online wallet comprises the steps of:

The user decides to add a card to his online wallet;

The wallet checks whether credit card issuer offers additional online authentication;

If so, the wallet asks the user to opt into the online authentication of credit card issuer; and If the user opts in, the wallet redirects the user to the credit card issuer for PIN creation.

The card enrollment for online transactions at the credit card issuer site typically comprises steps of:

The user navigates to the issuer site;

The user creates an issuer specific PIN to enroll the card; and

The user also enrolls in for an online wallet if he has not yet enrolled, creating an L2P. Note that the L2P could be different from the PIN.

Figure 3:
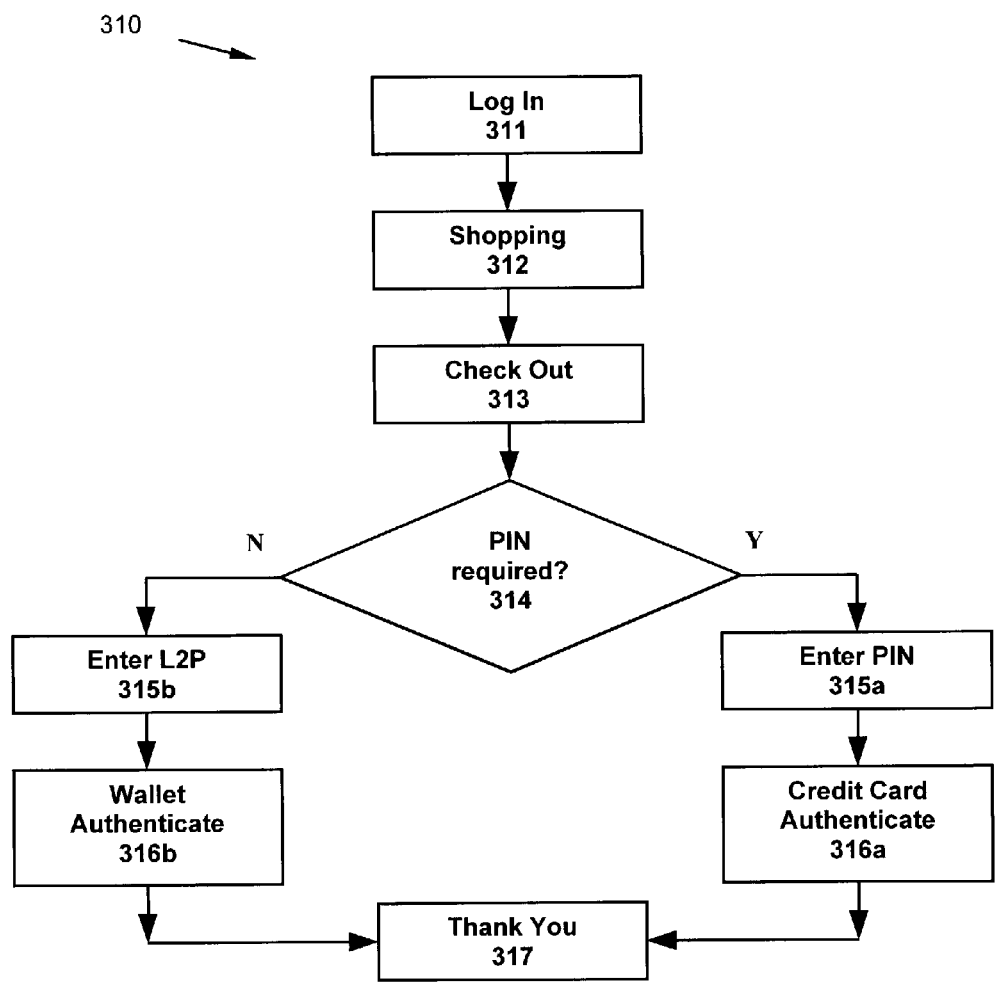
FIG. 3 is a flow diagram illustrating a method for providing secure online transactions according to another embodiment of the invention.

FIG. 3 is a flow diagram illustrating a method 310 for providing secure online transactions according to another embodiment of the invention. A typical embodiment of the method comprises the steps of:

Step 311: The user logs into a merchant site;

Step 312: The user shops at the merchant site;

Step 313: The user starts to check out at the merchant site by picking a card from the wallet to complete the purchase;

Step 314: The wallet determines whether secure credit card authentication is deployed by the merchant and whether the card being used is a card that enrolls into secure credit card authentication;

Step 315a: If both conditions are true, the wallet redirects the user to the credit card issuer for authentication using an issuer specific PIN;

Step 316a: The credit card issuer authenticates the user's credit card; and

Step 317: The user completes check out.

Figure 4A:
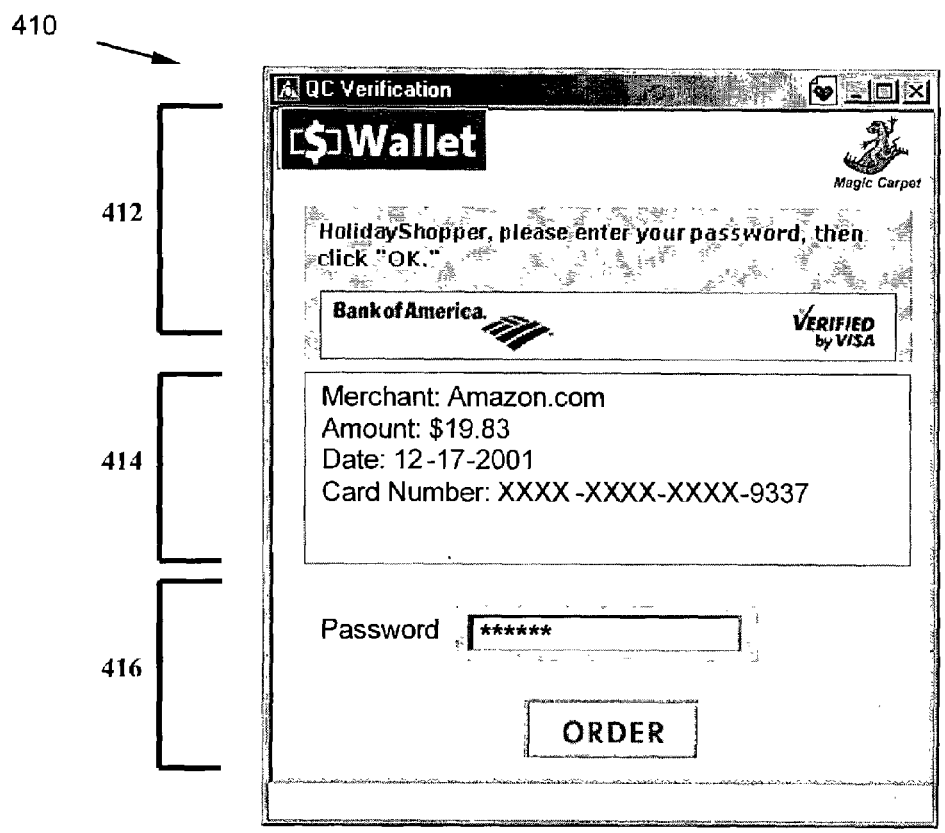
FIG. 4a is a display that prompts the user for password entry after the user select a credit card from the wallet.

FIG. 4A shows a display the user sees when he starts to check out at the merchant site. At the top of the display are the wallet's greetings 412 to the user. The summary of the user's orders 414 comes next in the display. In the summary 414, the user is able to find the identification of the credit card, the amount to be charged, date of transaction, etc. At the bottom of the display is an area 416 that the user can interacts with the wallet. The user is presented an input box to enter his password and a button for the use to complete the check out process after he enters his password.

Figure 4B:
FIG. 4b is a display showing after the wallet authenticates the user's password.

FIG. 4B shows the display the user sees when the wallet has authenticated his password. The wallet notifies the user that he has completed the order process.

If the answer to step 314 above is no, then the method continues with the steps of:

Step 315b: The user enters L2P;

Step 316b: The wallet authenticates the user; and

Step 317: The user completes check out.

In this embodiment, the option to make users enter both an L2P for wallet access and a PIN for issuer authentication is typically an unacceptable option. Therefore, it is necessary to provide access to the cards in user's wallet without L2P authentication. It is possible to show only the nicknames and hide the numbers at this stage, but this could still present a security issue. Further, the user still must enter a PIN for credit cards that need additional authentication from the issuer and an L2P for other cards. This may be somewhat confusing to the user. A mitigating factor is that most users have only one card in their wallet and may never see the difference. The user also must enter an L2P for credit cards that need additional authentication from the issuer when using the card at a merchant site that has not integrated with credit card issuer to perform secure credit card authentication. This situation can be eliminated if it is ensured that online wallet integration at a merchant site automatically ensures secure credit card authentication integration and vice versa.

When the user has multiple credit cards enrolled in the online wallet, the user can have different PINs from different issuers that are different from his L2P.

This could result in proliferation of passwords and potentially confusing user experience.

A payment markup language (PML) is created to describe payment transactions and allow them to be inserted in extensible HTML (XHTML) pages as well as in web service messages. The PML specification comprises two sub-specifications: a core specification and a frame specification.

The PML core specification describes simple online transactions. For example, a charge of $20 from someone@aol.com to AMAZON.COM can be represented by the following when represented in PML core specification:

```
<transaction xlmns="http://example.org/pml-core">
    <sender>someone@aol.com</sender>
    <receiver>amazon.com</receiver>
    <amount>20</amount>
    <currency>dollar</currency>
</transaction>
```

The PML frame contains the rest of the PML specification that allows the PML core message to be embedded in a web service message. The PML frame is inline with the SOAP specification. The following example shows the structure of a web service message that contains transaction represented in PML core specification:

```
<soap:Envelope . . . >
    <soap:Header . . . />
    <soap:Body>
        <m:transact xlmns=" . . . ">
            <acquirer>somebank.com</acquirer>
            <!--PML core goes here -->
            <!--other operations -->
        </m:transact>
    </soap:Body>
</soap:Envelope>
```

The method to perform online transactions using the payment markup language specification comprises the following steps:

A browser receives from a server an XHTML page containing a PML core message. Because the PML-core has its own namespaces, the PML core message is readily contained the XHTML page without modifications to XHTML specification.

The browser renders the XHTML page containing a PML core message to a page that resembles a real word receipt and a "sign" button.

The browser signs the PML core message with the user's certicate and sends the signature back to the server when the user clicks on the "sign" button.

The certificate can be installed by the user using standard browser methods. Alternatively, the certificate/private key can be stored in a smart card device. When the user clicks on the "sign" button, the PML core message is sent for signing to the smart card.

The server constructs the complete PML message and sends it to a payment gateway. The signature can be sent using the XML digital signature specification. Moreover, the signature is stored on the server in case of future disputes.

The payment gateway verifies the message along with the PML core signature and proceeds to honor the request.

The user's certificate is issued by the user's bank. This effectively means that the bank is really the authentication provider.

One issue to above method is that the message and signature may be stolen by a hacker and he can send the message many times along with the user's signature to the payment gateway. This user's bank account will reach to zero balance or his credit card exceeds the allowed credit limit, which makes the bank account or credit card unusable. This issue can be easily solved by adding a unique transaction identifier and a date and time that the transaction takes place to produce non-repudiation. Now the copies of the message are recognized as the same transaction, the payment gateway may simply ignore these copies sent by the hacker because it has already processed the associated transactions.

Although the invention is described herein with reference to the preferred embodiment, one skilled in the art will readily appreciate that other applications may be substituted for those set forth herein without departing from the spirit and scope of the present invention.

Accordingly, the invention should only be limited by the claims included below.

The invention claimed is:

1. An online transaction method comprising the steps of:
registering, by a user, to a merchant through a wallet service by providing said user's personal and credit card information, wherein said step of registering at a site of said merchant further comprises the steps of:
starting, by said user, to add a credit card to said wallet;
said wallet contacting a credit card issuer over a network and checking whether said credit card issuer provides online enrollment of additional online authentication;
said wallet asking said user to opt into online credit card authentication from said credit card issuer;
performing a step from a group of steps consisting of:
storing said credit card into said wallet when said user does not opt in; and
notifying said credit card issuer when the user does opt in;
the user providing a first level authentication to said merchant when said user logs on to start a transaction;
shopping, by said user, at a site of said merchant;
starting check out from said site of said merchant;
entering, by said user, a level-two authentication password;
authenticating, by said wallet, said user using said level-two authentication password; and
completing check out at said site of said merchant using a credit card enrolled in said wallet.

2. The method of claim 1, further comprising the steps of:
notifying said credit card issuer if said user opts in online credit card authentication.

3. The method of claim 1, wherein said step of registering at a site of said credit card issuer further comprises the steps of:
navigating, by said user, to said site of said credit card issuer;
asking, by said issuer, said user to login using said wallet service; and
enrolling said credit card without need to create any PIN if said user has already registered to said wallet and has already created said level-two authentication password.

4. The method of claim 3, further comprising the steps of:
creating said level-two authentication password if said user has not yet created said level-two authentication password; and
using said level-two authentication password as personal identification number to enroll said credit card with said credit card issuer.

5. An online transaction method comprising the steps of:
registering, by a user, to a merchant through a wallet service by providing his personal and credit card information;
said user adding a credit card to said wallet;
said wallet contacting a credit card issuer over a network and checking whether said credit card issuer provides online enrollment of additional online authentication;
said wallet asking said user to opt into online credit card authentication from said credit card issuer;
performing a step from a group of steps consisting of:
storing said credit card into said wallet when said user does not opt in; and
notifying said credit card issuer when the user does opt in;
the user providing a first level authentication to said merchant when said user logs on to start a transaction;
shopping, by said user, at a site of said merchant;
starting, by said user, check out from said site of said merchant;
entering, by said user, a level-two authentication password;
selecting, by said user, a credit card from said wallet;
figuring out, by said wallet, whether said credit card authentication by a credit card issuer can be performed;
authenticating, by said wallet, said user using said level-two authentication password if said credit card authentication by said credit card issuer can not be performed; and
completing, by said user, check out at said site of said merchant.

6. The method of claim 5, further comprising the steps of:
entering, by said user, a personal identification number; and
redirecting, by said wallet, said user to said credit card issuer for authentication using said personal identification number.

7. The method of claim 5, further comprising the steps of:
redirecting said user to said credit card issuer for creation of said personal identification number if said user opts in online credit card authentication.

8. The method of claim 5, wherein said step of registering at a site of said credit card issuer further comprising the steps of:
navigating, by said user, to said site of said credit card issuer;
creating, by said user, said personal identification number to enroll said credit card; and
enrolling, by said user, into said wallet and creating said level-two authentication password if he has not yet enrolled into said wallet.

9. An apparatus for performing online transactions comprising:
means for registering a user to a merchant;
means for providing personal information and credit card information of the user;
means for providing a level-one authentication password;
means for providing a level-two authentication password;
wherein said level-two authentication password is equivalent to said personal identification number,
means for storing said personal information and said credit card information of the user;
means for creating said level-one authentication password;
means for creating said level-two authentication password;

a first level authentication means for authenticating the user to said merchant to access said personal information by the user, wherein the user provides authentication information to said merchant;

a second level authentication means for authenticating the user to said merchant using said level-two authentication password to access said credit card information; and means for determining whether a credit card issuer requires a personal identification number for online use of said credit card information; and means for using use said level-two authentication password as personal identification number to enroll said credit card with said credit card issuer.

10. The apparatus of claim 9, wherein said level-two authentication password is not equivalent to said personal identification number.

11. The apparatus of claim 10, wherein said personal identification number is required to authenticate online use of said credit card information by said credit card issuer, further comprising:

a graphical interface for said user to provide said personal identification number; and a module for redirecting said user to said credit card issuer for authentication using said personal identification number.

12. The apparatus of claim 11, further comprising:

a module for redirecting said user to said credit card issuer for personal identification number creation if said user opts in online credit card authentication.

* * * * *